US011030801B2

(12) United States Patent
Huber et al.

(10) Patent No.: US 11,030,801 B2
(45) Date of Patent: Jun. 8, 2021

(54) THREE-DIMENSIONAL MODELING TOOLKIT

(71) Applicant: Standard Cyborg, Inc., San Francisco, CA (US)

(72) Inventors: Jeffrey Huber, San Francisco, CA (US); Aaron Thompson, San Francisco, CA (US); Ricky Reusser, Oakland, CA (US); Dustin Dorroh, San Francisco, CA (US); Eric Arnebäck, Hyssna (SE); Garrett Spiegel, San Francisco, CA (US)

(73) Assignee: Standard Cyborg, Inc., San Francisco, CA (US)

( * ) Notice: Subject to any disclaimer, the term of this patent is extended or adjusted under 35 U.S.C. 154(b) by 0 days.

(21) Appl. No.: 16/580,868

(22) Filed: Sep. 24, 2019

(65) Prior Publication Data
US 2020/0364927 A1 Nov. 19, 2020

Related U.S. Application Data

(60) Provisional application No. 62/849,286, filed on May 17, 2019.

(51) Int. Cl.
*G06T 17/00* (2006.01)
*G06T 19/00* (2011.01)

(52) U.S. Cl.
CPC .............. *G06T 17/00* (2013.01); *G06T 19/00* (2013.01); *G06T 2219/004* (2013.01)

(58) Field of Classification Search
CPC ...................... B23K 26/50; G02B 5/32; G05B 2219/45163; G06K 9/00201; G06K 9/00281; G06K 9/4604; G06K 9/6256; G06T 17/00; G06T 19/00; G06T 2210/56; G06T 2219/004
See application file for complete search history.

(56) References Cited

U.S. PATENT DOCUMENTS

| 2015/0055085 A1* | 2/2015 | Fonte ................... A61B 3/0041 351/178 |
| 2017/0193699 A1* | 7/2017 | Mehr ....................... G06F 17/10 |
| 2017/0304950 A1* | 10/2017 | Moore ................... B23K 26/08 |
| 2018/0143023 A1* | 5/2018 | Bjorke .................. G06T 19/003 |
| 2019/0139300 A1* | 5/2019 | Kirchberg ............ G01B 11/026 |

* cited by examiner

*Primary Examiner* — Ming Wu
(74) *Attorney, Agent, or Firm* — Schwegman Lundberg & Woessner, P.A.

(57) ABSTRACT

A 3D scanning toolkit to perform operations that include: accessing a first data stream at a client device, wherein the first data stream comprises at least image data; applying a bit mask to the first data stream, the bit mask identifying a portion of the image data; accessing a second data stream at the client device, the second data stream comprising depth data associated with the portion of the image data; generating a point cloud based on the depth data, the point cloud comprising a set of data points that define surface features of an object depicted in the first data stream; and causing display of a visualization of the point cloud upon a presentation of the first data stream at the client device.

20 Claims, 10 Drawing Sheets

300

ACCESSING A FIRST DATA STREAM AT A CLIENT DEVICE, THE FIRST DATA STREAM COMPRISING IMAGE DATA
302

APPLYING A BIT MASK TO THE FIRST DATA STREAM, THE BIT MASK IDENTIFYING A PORTION OF THE IMAGE DATA
304

ACCESSING A SECOND DATA STREAM AT THE CLIENT DEVICE, THE SECOND DATA STREAM COMPRISING DEPTH DATA ASSOCIATED WITH THE PORTION OF THE IMAGE DATA
306

GENERATING A POINT CLOUD BASED ON THE DEPTH DATA, THE POINT CLOUD COMPRISING A SET OF DATA POINTS THAT DEFINE SURFACE FEATURES OF AN OBJECT DEPICTED IN THE FIRST DATA STREAM
308

CAUSING DISPLAY OF A VISUALIZATION OF THE POINT CLOUD UPON A PRESENTATION OF THE FIRST DATA STREAM AT THE CLIENT DEVICE
310

*FIG. 3*

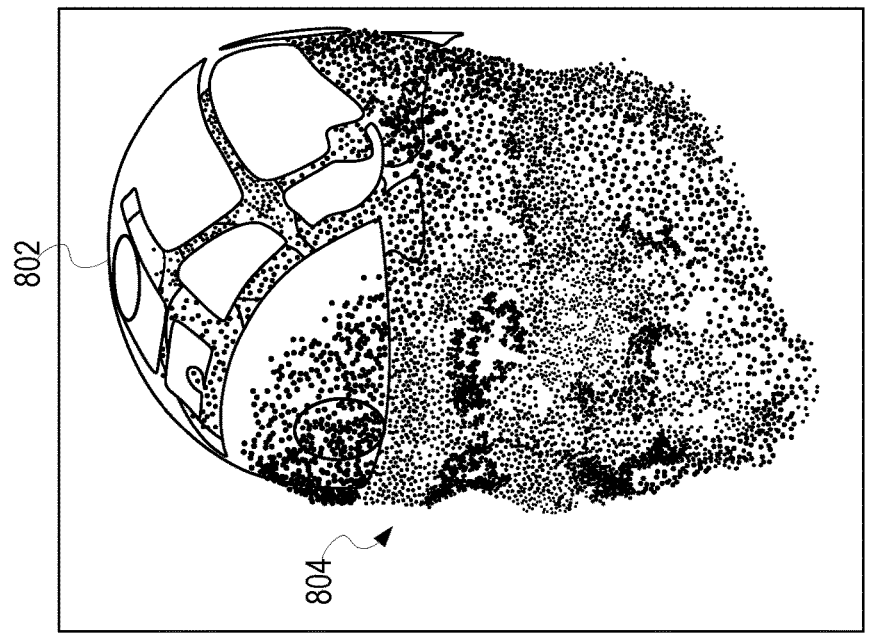
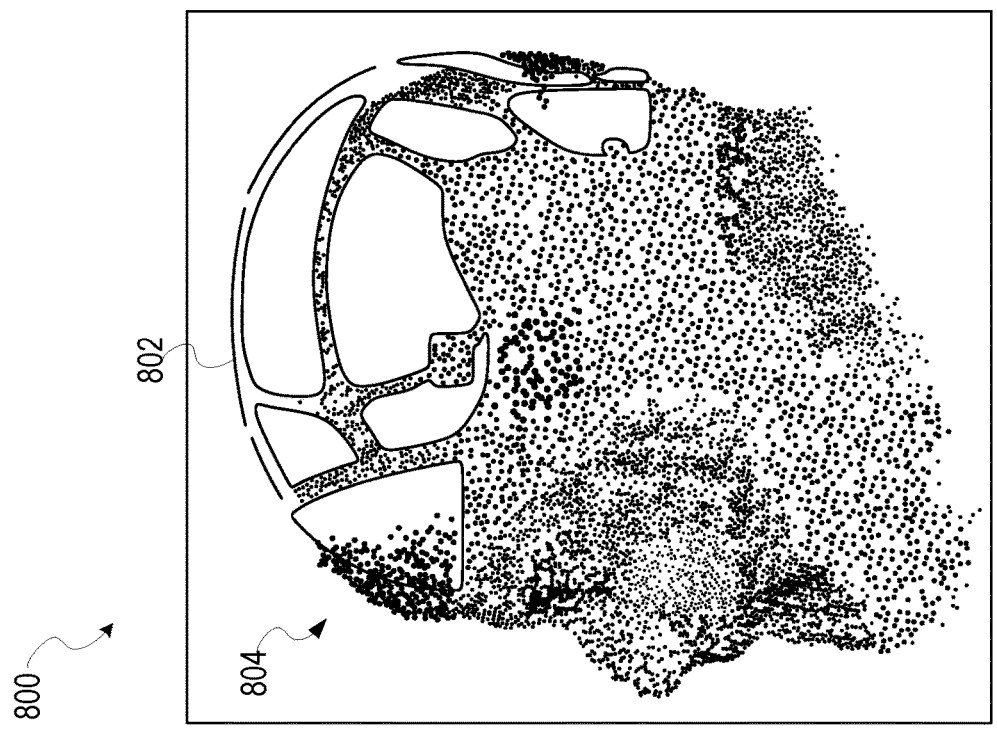
FIG. 8

THREE-DIMENSIONAL MODELING TOOLKIT

CROSS-REFERENCE TO RELATED APPLICATION

This patent application claims the benefit of U.S. Provisional Patent Application No. 62/849,286, filed May 17, 2019, entitled "3D MODELING TOOLKIT", which is incorporated by reference herein in its entirety.

TECHNICAL FIELD

Embodiments of the present disclosure relate generally to three-dimensional (3D) modeling, and more particularly, to systems for generating 3D models.

BACKGROUND 3D modeling is the process of developing a mathematical representation of a surface of an object in three dimensions, via specialized sensors and software. 3D models represent the surfaces of objects using a collection of points in 3D space, connected by various geometric entities such as triangles, lines, and curved surfaces.

3D models can be generated by a 3D scanner, which can be based on many different technologies, each with their own limitations, advantages, and costs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart illustrating a method for generating and causing display of a 3D model based on a point cloud, according to certain example embodiments.

FIG. 8 is a diagram depicting a 3D model retrieved based on a point cloud, according to certain example embodiments.

DETAILED DESCRIPTION

Figure 1:
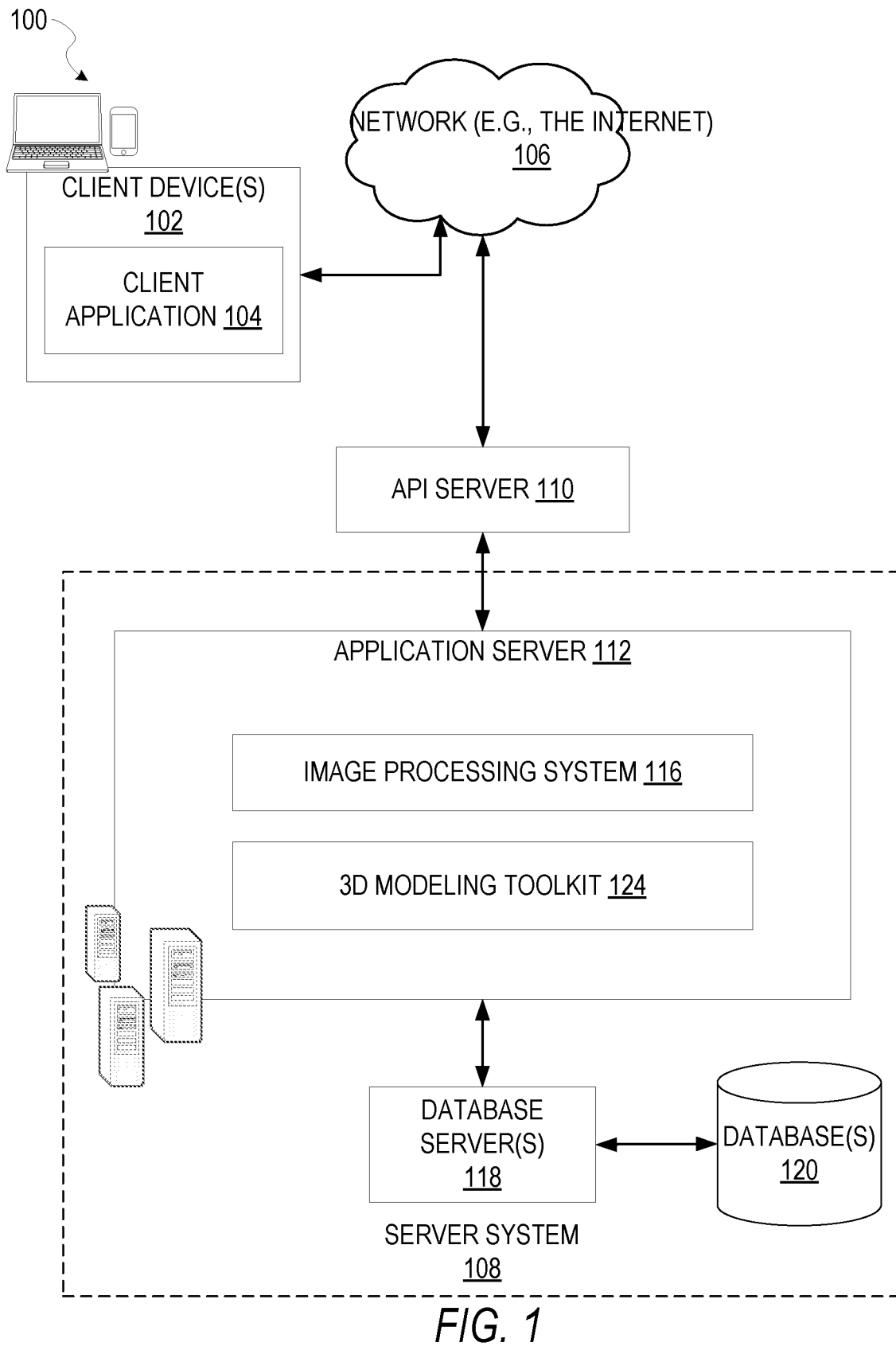
FIG. 1 is a block diagram showing an example 3D modeling system for exchanging data (e.g., messages and associated content) over a network in accordance with some embodiments, wherein the 3D modeling system includes a 3D modeling toolkit.

As discussed above, 3D modeling is the process of developing a mathematical representation of a surface of an object in three dimensions, via specialized sensors and software. While existing methods of generating 3D models are functionally effective, they are often difficult and inconvenient to apply in a number of use cases. As a result, a more user-friendly approach is needed.

Example embodiments described herein relate to a system that includes a 3D scanning toolkit to perform operations that include: accessing a first data stream at a client device, wherein the first data stream comprises at least image data; applying a bit mask to the first data stream, the bit mask identifying a portion of the image data; accessing a second data stream at the client device, the second data stream comprising depth data associated with the portion of the image data; generating a point cloud based on the depth data, the point cloud comprising a set of data points that define surface features of an object depicted in the first data stream; and causing display of a visualization of the point cloud upon a presentation of the first data stream at the client device.

According to some example embodiments, the first data stream and second data stream accessed at the client device may comprise RGB-D data, wherein each data point comprises an RGB component as well as a depth component. The depth data from the data stream indicates a distance between an image plane and an objected depicted by the data stream, where the image plane is identified as the plane of a display monitor or device users to view an image rendered based on the data stream.

In some example embodiments, responsive to accessing the first data stream at the client device, the system accesses and applies a bit-mask to the first data stream, wherein the bit-mask defines which data points of the data stream to scan for depth data. For example, the bit-mask may specify areas depicted by the data stream "to be scanned," or "not to be scanned," (i.e., sets areas depicted by the data stream that are not within the bit-mask to a null value) based on attributes of the data points. As an illustrative example, the data stream may depict a person, and the bit-mask may be configured to mask out everything but the person's head, or even specific portions of the person's head (i.e., just circumference of top of head) such that depth data indicating surface features of the person's head is collected.

In some embodiments, the 3D modeling toolkit may provide an interface to enable a user to provide a selection of one or more bit-masks to be applied to a data stream, wherein each of the one or more bit-masks may correspond with a different object or category. The data stream may comprise image data (e.g., pictures or video) that depicts one or more objects or people. The bit-masks may therefore be organized based on object categories, or measurement types. For example, a bit mask may be associated with a measurement category for "helmet," or "glasses," wherein the corresponding bit-masks mask out the pixels not needed for the measurements. Accordingly, a bit-mask associated with the "helmet" measurement category may filter out everything in the image but a person's head (or specific portions of a person's head). In further embodiments, the 3D modeling toolkit may perform one or more image recognition techniques to identify objects depicted in the image data of a data-stream in order to automatically select one or more bit-masks to present to a user of the 3D modeling toolkit as recommendations.

Based on the bit-mask applied to the first data stream, the system accesses a portion of a second data stream that comprises depth data, wherein the portion of the second data stream is based on the bit-mask. In such embodiments, the 3D modeling toolkit may access portions of the second data stream that correspond with the pixels indicated based on the bit-mask applied to the first data stream. For example, the bit-mask may assign a binary value to each pixel of an image generated based on the image data, to indicate if the system "should," or "should not" access the second data stream to scan a particular area depicted by the image data of the first data stream.

Based on the depth data of the second data stream, the system generates a point cloud. As discussed herein, a point cloud is a set of data points in a space which depicts the external surfaces of objects. In some example embodiments, the point cloud may be converted into a 3D model. For example, the point cloud may be converted into a polygon mesh model, a triangle mesh model, a non-uniform rational basis spline (NURBS) surface model, or a CAD model through one or more surface reconstruction techniques.

The system causes display of a visualization of the point cloud within a presentation of the image data from the first data stream at the client device. The visualization may for example be based on the 3D model generated based on the point cloud.

According to certain embodiments, the system saves the 3D model generated based on the point cloud at a memory location at the client device, or in some embodiments at a remote database. For example, the system may present an option to save the 3D model in the presentation of the image data at the client device.

In some example embodiments, the 3D modeling toolkit may provide one or more interfaces to generate training data for a machine learned model. For example, the 3D modeling toolkit may access a memory repository that comprises one or more 3D models generated based on point clouds and provide an interface to display presentations of the 3D models at a client device. A user of the client device may provide semantic labels to be applied to the 3D models through the one or more interfaces. The labeled 3D models may then be utilized to train a machine learned model.

For example, a machine learned model may be fit on a training dataset, wherein the training dataset is generated based on the point clouds collected by the 3D modeling toolkit. The machine learned model may then be trained using a supervised learning method.

FIG. 1 is a block diagram showing an example modeling system 100 for exchanging data over a network. The modeling system 100 include one or more client devices 102 which host a number of applications including a client application 104. Each client application 104 is communicatively coupled to other instances of the client application 104 and a server system 108 via a network 106 (e.g., the Internet).

Accordingly, each client application 104 is able to communicate and exchange data with another client application 104 and with the server system 108 via the network 106. The data exchanged between client applications 104, and between a client application 104 and the server system 108, includes functions (e.g., commands to invoke functions) as well as payload data (e.g., text, audio, video or other multimedia data).

The server system 108 provides server-side functionality via the network 106 to a particular client application 104. While certain functions of the modeling system 100 are described herein as being performed by either a client application 104 or by the server system 108, it will be appreciated that the location of certain functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. In some embodiments, this data includes, image data, Red-blue-green (RBG) data, depth data, inertial measurement unit (IMU) data, client device information, geolocation information, as examples. In other embodiments, other data is used. Data exchanges within the modeling system 100 are invoked and controlled through functions available via GUIs of the client application 104.

Turning now specifically to the server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits data between the client device 102 and the application server 112. Specifically, the Application Program Interface (API) server 110 provides a set of interfaces (e.g., routines and protocols) that can be called or queried by the client application 104 in order to invoke functionality of the application server 112. The Application Program Interface (API) server 110 exposes various functions supported by the application server 112, including account registration, login functionality, the sending of messages or content, via the application server 112, from a particular client application 104 to another client application 104, the sending of media files (e.g., images or video) from a client application 104 to the server application 114, and for possible access by another client application 104, opening and application event (e.g., relating to the client application 104).

The application server 112 hosts a number of applications and subsystems, including a server application 114, an image processing system 116, and a 3D modeling toolkit 124. The server application 114 implements a number of image processing technologies and functions, particularly related to the aggregation and other processing of content (e.g., image data) received from multiple instances of the client application 104. As will be described in further detail, the image data from multiple sources may be aggregated into collections of content. These collections are then made available, by the server application 114, to the client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received from one or more client devices 102 at the messaging server application 114.

The application server 112 is communicatively coupled to a database server 118, which facilitates access to a database 120 in which is stored data associated with image data processed by the messaging server application 114.

Figure 2:
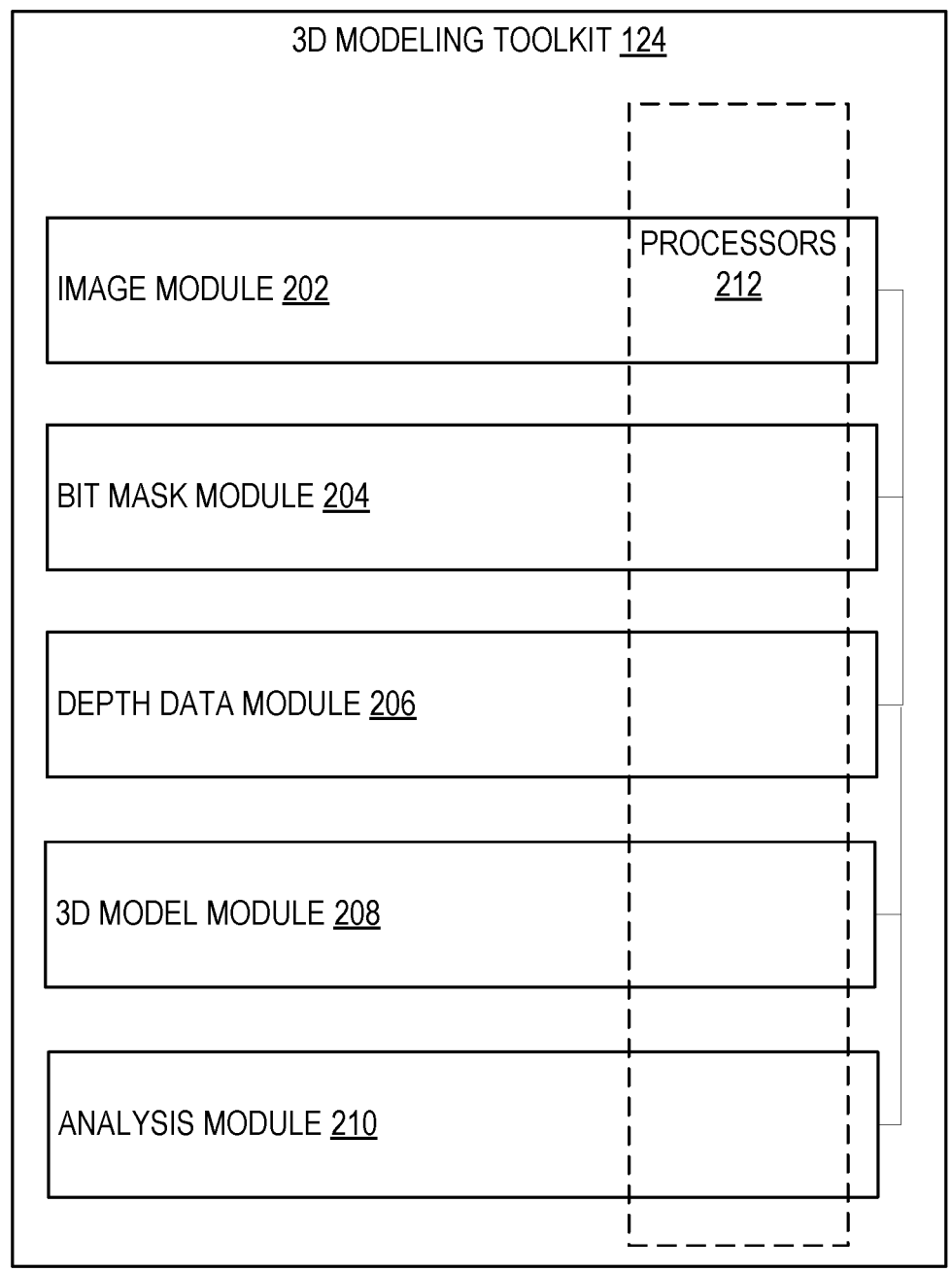
FIG. 2 is a block diagram illustrating various modules of a 3D modeling toolkit, according to certain example embodiments.

FIG. 2 is a block diagram illustrating components of the 3D modeling toolkit 124 that configure the 3D modeling toolkit 124 to generate a 3D model based on a point cloud, according to certain example embodiments.

The 3D modeling toolkit 124 is shown as including an image module 202, a bit mask module 204, a depth data module 206, a 3D model module 208, and an analysis module 210, all configured to communicate with each other (e.g., via a bus, shared memory, or a switch). Any one or more of these modules may be implemented using one or more processors 212 (e.g., by configuring such one or more processors to perform functions described for that module) and hence may include one or more of the processors 212.

Any one or more of the modules described may be implemented using hardware alone (e.g., one or more of the processors 212 of a machine) or a combination of hardware and software. For example, any module described of the 3D modeling toolkit 124 may physically include an arrangement of one or more of the processors 212 (e.g., a subset of or among the one or more processors of the machine) configured to perform the operations described herein for that module. As another example, any module of the 3D modeling toolkit 124 may include software, hardware, or both, that configure an arrangement of one or more processors 212 (e.g., among the one or more processors of the machine) to perform the operations described herein for that module. Accordingly, different modules of the 3D modeling toolkit 124 may include and configure different arrangements of such processors 212 or a single arrangement of such processors 212 at different points in time. Moreover, any two or more modules of the 3D modeling toolkit 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 3 is a flowchart illustrating a method 300 for generating and causing display of a 3D model at a client device 102, according to certain example embodiments. Operations of the method 300 may be performed by the modules described above with respect to FIG. 2. As shown in FIG. 3, the method 300 includes one or more operations 302, 304, 306, and 308.

At operation 302, the image module 202 accesses a first data stream at the client device 102, wherein the first data stream comprises image data. For example, the image data may include RGB data.

At operation 304, the bit mask module 204 applies a bit mask to the first data stream, wherein the bit mask identifies a portion of the image data. In some embodiments, the bit mask module 204 may access the bit mask based on an input received from the client device 102 or based on attributes of the image data from the first data stream. For example, the bit mask may be selected from among a plurality of bit masks, wherein each bit mask among the plurality of bit masks is configured based on features of image data.

In some embodiments, the bit mask module 204 may apply a machine learned model to identify the portion of the image data. For example, as will be discussed in more detail in the method 400 of FIG. 4, the bit mask module 204 may access a machine learned model based on attributes of the image data, wherein the machine learned model is trained to apply one or more semantic labels to the image data, wherein the one or more semantic labels may indicate regions within the image data to scan or not.

For example, the bit mask may assign a binary pixel value to areas in the image data based on features of the image data. By doing so, some areas in the image data (i.e., those areas assigned a 0 pixel value) may be "masked," indicating that those areas are not to be scanned, while other areas (i.e., those areas assigned a 1 pixel values) are scanned for depth data.

At operation 306, the depth data module 206 accesses a second data stream at the client device 102, wherein the second data stream comprises depth data associated with the portion of the image data identified based on the bit mask applied to the image data.

At operation 308, the depth data module 206 generates a point cloud based on the depth data, wherein the point cloud comprises a set of data points that define surface features of an object depicted in the first data stream. At operation 310, the 3D modeling module 208 generates and causes display of a visualization of the point cloud upon a presentation of the first data stream at the client device 102.

Figure 4:
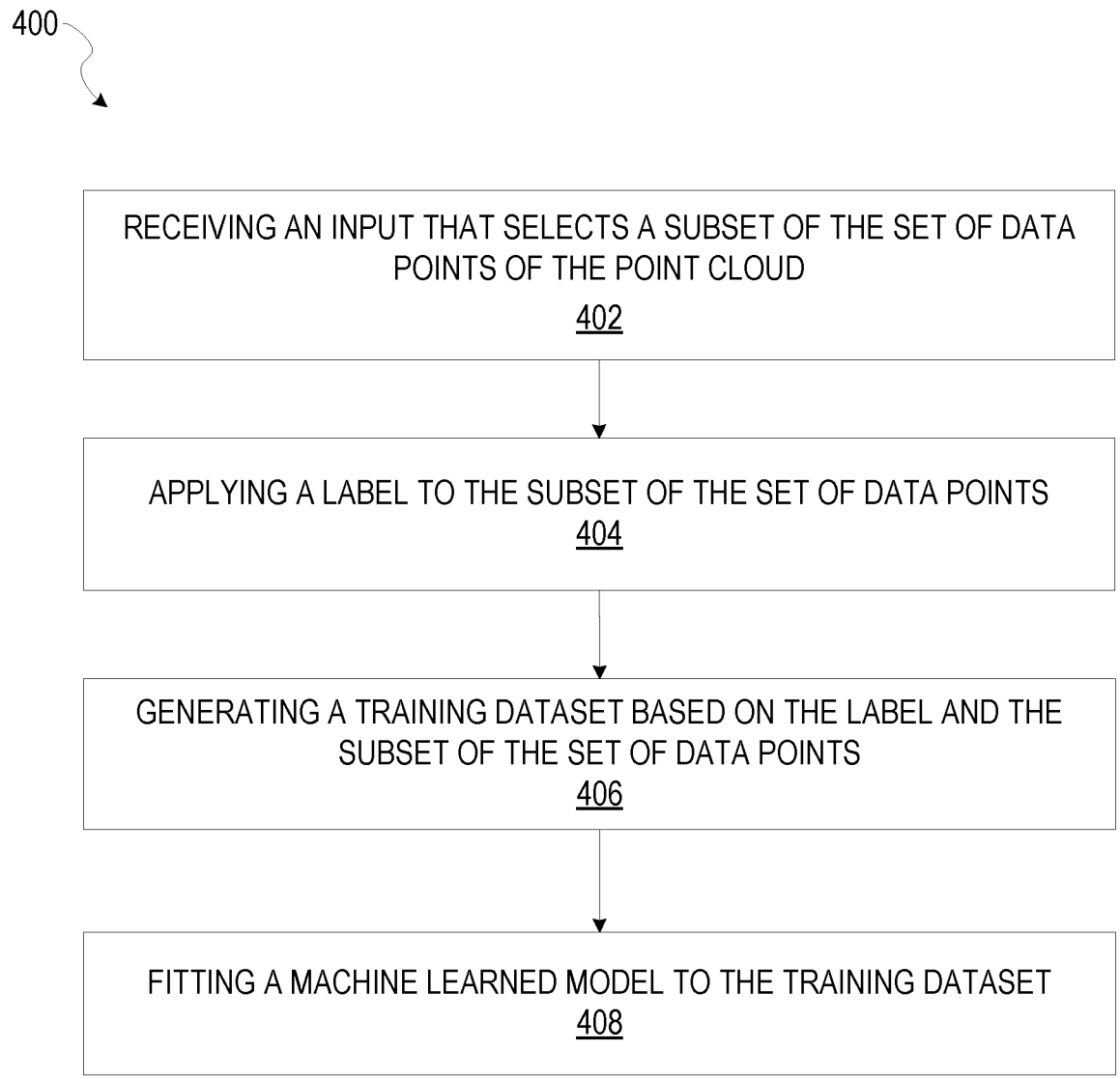
FIG. 4 is a flowchart illustrating a method for preparing a training data set for a machine learned model, according to certain example embodiments.

FIG. 4 is a flowchart illustrating a method 400 for preparing a training data set for a machine learned model, according to certain example embodiments. Operations of the method 400 may be performed by the modules described above with respect to FIG. 2. As shown in FIG. 4, the method 400 includes one or more operations 402, 404, 406, and 408, that may be performed as a part of (e.g., a subroutine, or subsequent to) the method 300 depicted in FIG. 3.

According to certain example embodiments, subsequent to operation 308 of the method 300, wherein a point cloud is generated by the depth module 206, at operation 402 the 3D modeling toolkit 124 receives an input that selects a subset of the set of data points of the point cloud. For example, the 3D modeling toolkit 124 may cause display of an interface to receive inputs selecting the subset of the set of data points, wherein the inputs may for example include an input that "paints" the subset of the set of data points with a cursor, or in some embodiments through a tactile input.

At operation 404 the 3D modeling toolkit 124 applies a label to the subset of the set of data point identified based on the input. The label may include a semantic label, or a classification. For example, semantic labeling features may for example include: contextual features that correspond with a physical object, location, or surface; analogical features that reference some other known category or class; visual features that define visual or graphical properties of a surface or object; as well as material parameters that define properties of a surface or object and which may include a "roughness value," a "metallic value," a "specular value," and a "base color value."

At operation 406, the 3D modeling toolkit 124 generates a training dataset based on the label and the subset of the set of data points identified based on the input.

At operation 408, the 3D modeling toolkit 124 fits a machine learned model to the training dataset. Accordingly, the machine learned model may be trained to apply semantic labels to portions of image data, wherein the semantic labels include bit-mask values (i.e., binary values indicating to scan or not scan).

Figure 5:
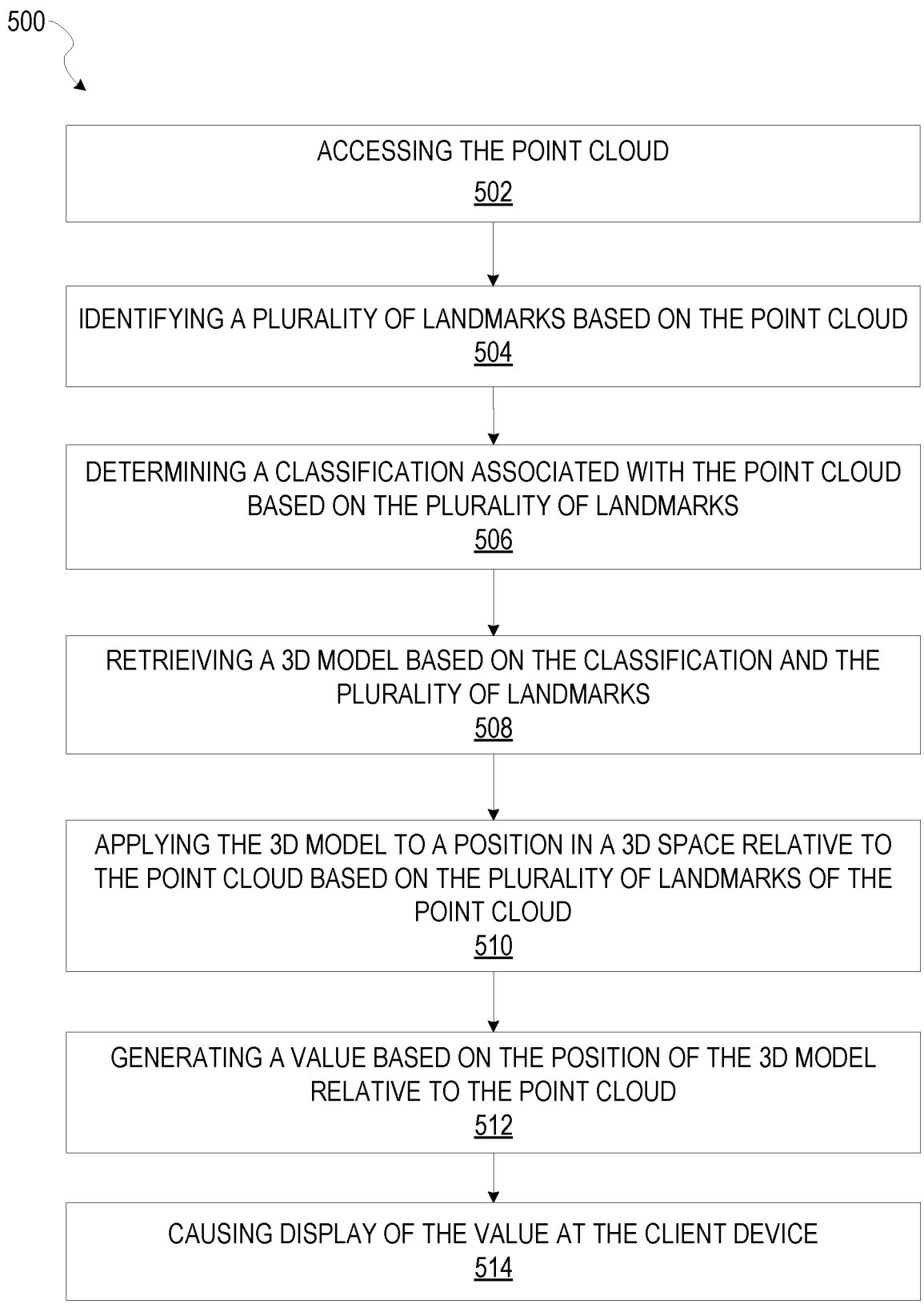
FIG. 5 is a flowchart illustrating a method for presenting a value based on a point cloud, according to certain example embodiments.

FIG. 5 is a flowchart illustrating a method 500 for presenting a value based on a point cloud, according to certain example embodiments. Operations of the method 500 may be performed by the modules described above with respect to FIG. 2. As shown in FIG. 5, the method 500 includes one or more operations 502, 504, 506, 508, 510, 512, and 514, that may be performed as a part of (e.g., a subroutine, or subsequent to) the method 300 depicted in FIG. 3.

At operation 502, the analysis module 210 accesses the point cloud generated by the depth data module 206 at operation 308 of the method 300. At operation 504, the analysis module 210 identifies a plurality of landmarks based on the point cloud.

Responsive to identifying the plurality of landmarks, at operation 506 the analysis module 210 determines a classification associated with the landmarks, and at operation 508, causes the 3D model module 208 to retrieve a 3D model associated with the classification and the plurality of landmarks. For example, the database 120 may comprise a collection of 3D models accessible by the 3D modeling toolkit 124, wherein each 3D model among the collection of 3D models is associated with one or more landmarks.

At operation 510, the 3D model module 208 applies the 3D model to a position in a 3D space relative to the point cloud based on at least the plurality of landmarks of the point cloud.

At operation 512, the analysis module 210 generates a value based on the position of the 3D model relative to the point cloud, and at operation 514 causes display of the value at the client device 102.

As an illustrative example from a user perspective, the point cloud may depict a 3D representation of a human head. The analysis module 210 may analyze the point cloud to detect key landmarks (e.g., facial landmarks, etc.) for alignment and classification, and to fill missing portions of the point cloud by using machine learning.

Responsive to analyzing the point cloud and identifying the landmarks, the 3D model module 208 retrieves a 3D model of a helmet, and positions the 3D model of the helmet at a position relative to the point cloud that depicts the human head in order to calculate distances between the landmarks of the point cloud and the 3D model according to a geometric algorithm. The 3D model of the helmet and the point cloud are analyzed further in order to estimate sizing (i.e., a value), which can then be presented at a client device.

In some embodiments, the analysis module 210 may filter a collection based on the value. For example, the collection may comprise a plurality of objects with associated size values. The analysis module 210 may access the collection and filter the collection based on the value generated based on the position of the 3D model relative to the point cloud. In some embodiments, the filtered collection may then be presented at the client device 102.

Figure 6:
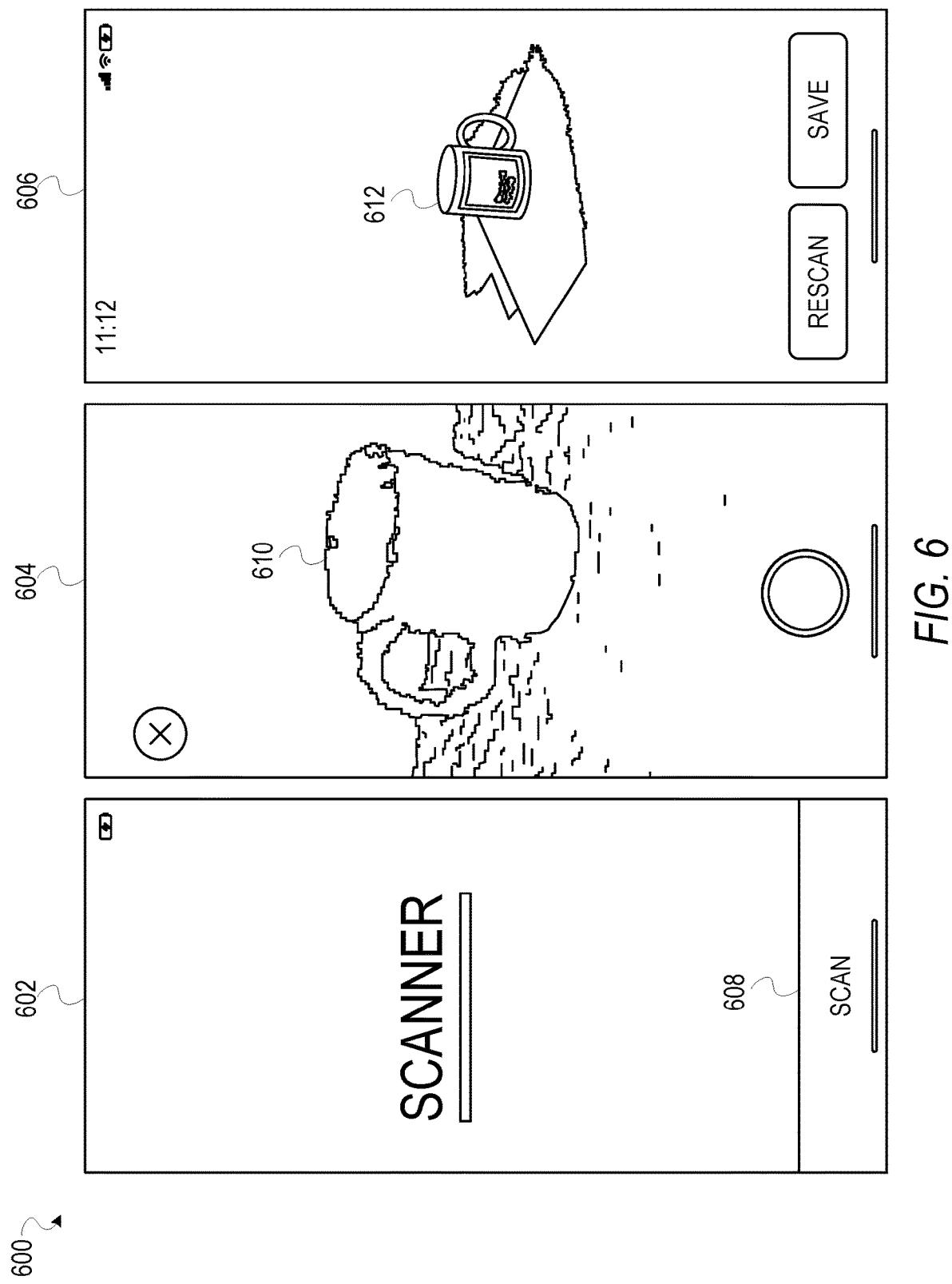
FIG. 6 is an interface flow diagram illustrating interfaces presented by a 3D modeling toolkit, according to certain example embodiments.

FIG. 6 is an interface flow diagram 600 illustrating interfaces presented by the 3D modeling toolkit 124, according to certain example embodiments, and as discussed in the method 300 depicted in FIG. 3.

Interface 602 depicts an interface to initiate a 3D scan. For example, a user of the 3D scanning toolkit 124 may provide an input through the interface element 608 that causes one or more modules of the 3D scanning toolkit 124 to initiate a 3D scan.

Interface 604 depicts a presentation of depth data 610 based on a second data stream, as discussed in operation 306 of the method 300. The depth data provides an indication of a distance of any given point to a reference position (i.e., a camera of the client device 102).

Interface 606 depicts a 3D model 612 generated based on a first data stream (i.e., image data), and a second data stream (i.e., depth data) presented at a client device 102. According to certain embodiments, the 3D modeling toolkit 124 may save the 3D model 612 at a memory location at the client device 102, or in some embodiments at a remote database such as the database 120.

Figure 7:
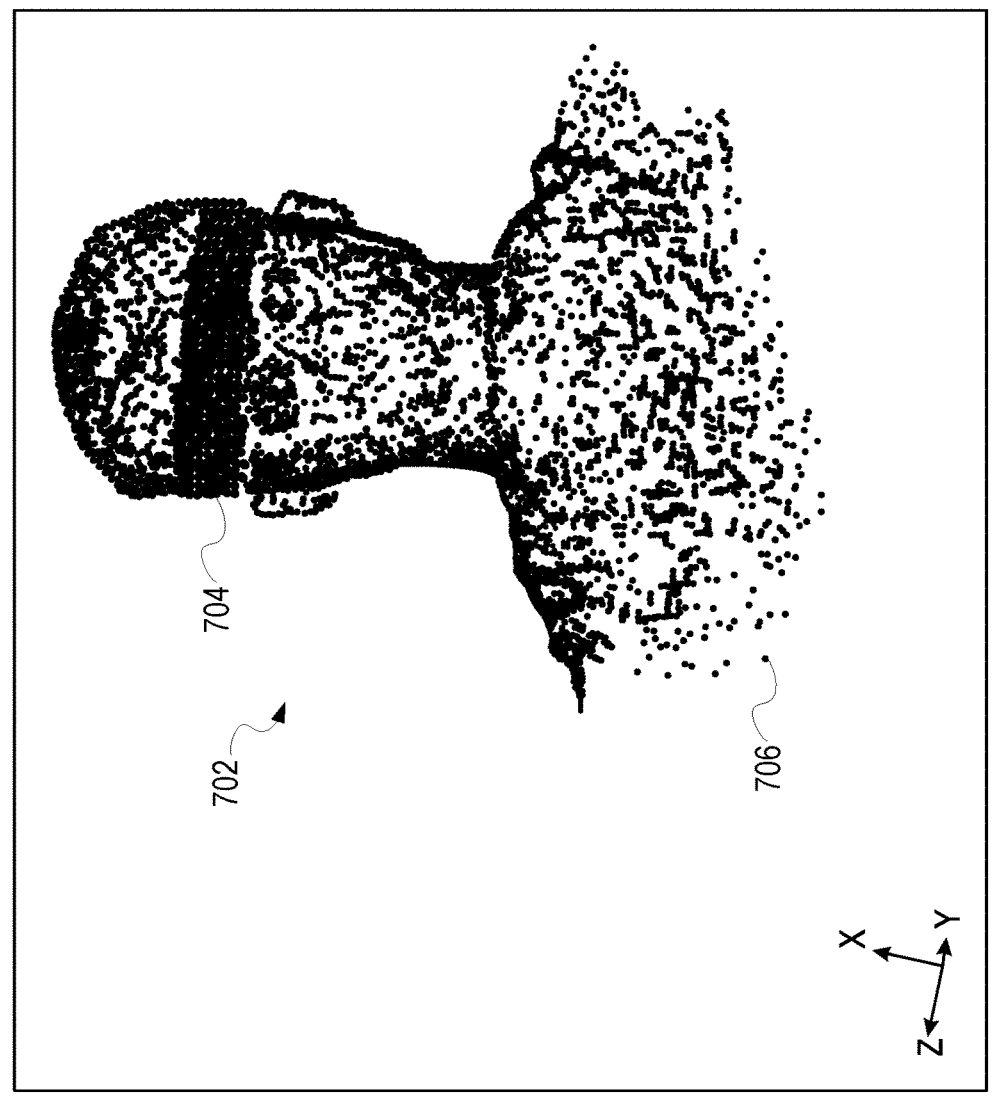
FIG. 7 is a diagram depicting a labeled point cloud, according to certain example embodiments.

FIG. 7 is a diagram 700 depicting a labeled point cloud 702, according to certain example embodiments, and as discussed in the method 400 depicted in FIG. 4. As seen in the diagram 700, a user of the 3D modeling toolkit 124 may provide input applying one or more labels to the point cloud 702.

As seen in the diagram 700, and as discussed in operation 308 of the method 300 depicted in FIG. 3, the depth data module 206 generates a point cloud (i.e., the point cloud 702) based on depth data, wherein the point cloud 702 comprises a set of data points that define surface features of an object depicted in a first data stream. For example, each data point of the point cloud 702 (e.g., data point 706) comprises data attributes that include location data as well as depth data that identify a position of the data point in a space.

In some example embodiments, the 3D modeling toolkit 124 may provide one or more interfaces to generate training data for a machine learned model. For example, a user of the client device 102 may provide inputs that select one or more data points from among the plurality of data points that make up the point cloud 702, to apply one or more semantic labels to the one or more data points. As seen in the diagram 700, the labeled points 704 may be presented in a different color or pattern from the unlabeled points of the point cloud 702.

FIG. 8 is a diagram 800 depicting a 3D model 802 retrieved based on a point cloud 848, according to certain example embodiments. As seen in the diagram 800, the point cloud 804 defines a set of surface features of an object (i.e., a face). As discussed in operation 502 of the method 500 depicted in FIG. 5, the analysis module 210 accesses the point cloud 804 generated by the depth data module 206 and identifies a plurality of landmarks based on the point cloud 804.

The analysis module 210 determines a classification associated with the landmarks defined by the point cloud 804 and causes the 3D model module 208 to retrieve a 3D model 802 from a collection of 3D models, based on at least the classification associated with the plurality of landmarks. The 3D model 802 may then be presented at a position among the presentation of the point cloud 804 at the client device 102.

Software Architecture

Figure 9:
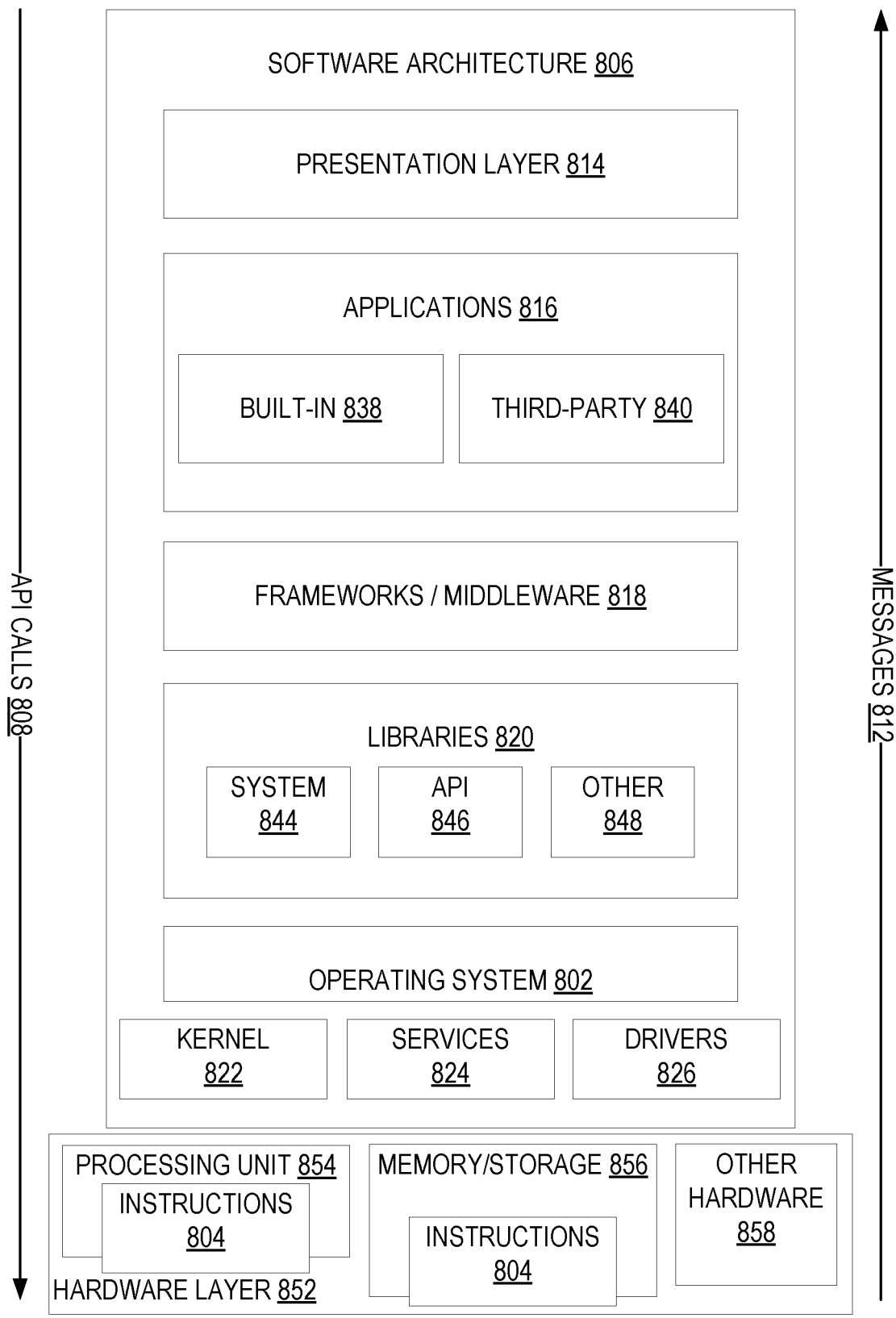
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as the machine 900 of FIG. 9 that includes, among other things, processors 904, memory 914, and I/O components 918. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
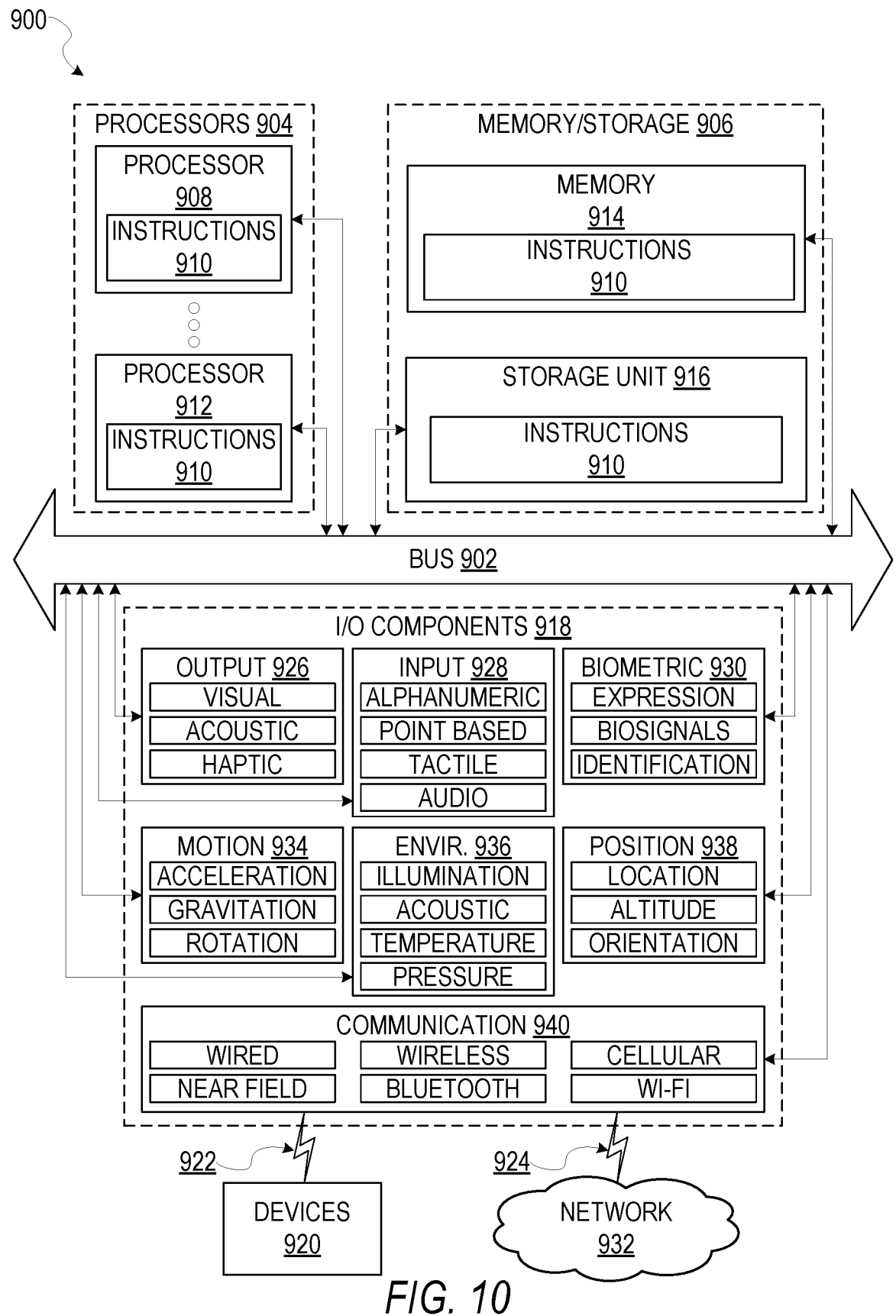
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"3D RECONSTRUCTION" in this context refers to a process of building a 3D model using multiple pieces of partial information about a subject.

"3D SCAN" in this context refers to the result of a 3D reconstruction.

"SIMULTANEOUS LOCATION AND MAPPING (SLAM)" in this context refers to a method of building a map or model of an unknown scene or subject while simultaneously keeping track of a device position within an environment.

"DEPTH FRAME" in this context refers to a snapshot in time of depth values from a sensor, arranged in a 2D grid, like an RGB camera frame. In certain embodiments the depth values are the distance in meters from a device to a subject.

"POINT CLOUD" in this context refers to and unordered array of points in 3D, wherein each point has an XYZ position, a color, a normal (which is a vector indicating the point's orientation), and other information.

"MESH" in this context refers to a collection of triangles.

What is claimed is:

1. A system comprising:
a memory; and
at least one hardware processor coupled to the memory and comprising instructions that causes the system to perform operations comprising:
accessing a first data stream at a client device, the first data stream comprising image data that comprises a set of image bits that comprise attributes, the image data depicting an object;
accessing a bit mask that corresponds with the object depicted by the image data from among a plurality of bit masks, the bit mask identifying a portion of the set of image bits of the image data based on the attributes of the portion of the set of image bits;
accessing a second data stream at the client device, the second data stream comprising depth data associated with the portion of the image data identified by the bit mask;
generating a point cloud based on the depth data, the point cloud comprising a set of data points that define surface features of an object depicted in the first data stream; and
causing display of a visualization of the point cloud at the client device.

2. The system of claim 1, wherein the instructions cause the system to perform operations further comprising:
receiving an input that selects a subset of the set of data points of the point cloud;
applying a label to the subset of the set of data points;
generating a training dataset based on the label and the subset of the set of data points; and
fitting a machine learned model to the training dataset.

3. The system of claim 1, wherein the instructions cause the system to perform operations further comprising:
accessing the point cloud;
identifying a plurality of landmarks based on the point cloud;
determining a classification associated with the point cloud based on the plurality of landmarks;
retrieving a 3D model based on the classification and the plurality of landmarks; and
applying the 3D model to a position in a 3D space relative to the point cloud, based on the plurality of landmarks of the point cloud.

4. The system of claim 3, wherein the instructions cause the system to perform operations further comprising:
- generating a value based on the position of the 3D model relative to the point cloud; and
- causing display of the value at the client device.

5. The system of claim 1, wherein the image data comprises a set of attributes, and the instructions cause the system to perform operations further comprising:
- selecting the bit mask from among the plurality of bit masks based on at least the set of attributes of the image data.

6. The system of claim 1, wherein the applying the bit mask to the first data stream includes:
- receiving an input that selects the bit mask from among a plurality of bit masks.

7. The system of claim 1, wherein the causing display of the visualization of the point cloud includes:
- presenting the visualization of the point cloud upon a presentation of the first data stream at the client device.

8. A method comprising:
- accessing a first data stream at a client device, the first data stream comprising image data that comprises a set of image bits that comprise attributes, the image data depicting an object;
- accessing a bit mask that corresponds with the object depicted by the image data from among a plurality of bit masks, the bit mask identifying a portion of the set of image bits of the image data based on the attributes of the portion of the set of image bits;
- accessing a second data stream at the client device, the second data stream comprising depth data associated with the portion of the image data identified by the bit mask;
- generating a point cloud based on the depth data, the point cloud comprising a set of data points that define surface features of an object depicted in the first data stream; and
- causing display of a visualization of the point cloud at the client device.

9. The method of claim 8, wherein the method further comprises:
- receiving an input that selects a subset of the set of data points of the point cloud;
- applying a label to the subset of the set of data points;
- generating a training dataset based on the label and the subset of the set of data points; and
- fitting a machine learned model to the training dataset.

10. The method of claim 8, wherein the method further comprises:
- accessing the point cloud;
- identifying a plurality of landmarks based on the point cloud;
- determining a classification associated with the point cloud based on the plurality of landmarks;
- retrieving a 3D model based on the classification and the plurality of landmarks; and
- applying the 3D model to a position in a 3D space relative to the point cloud, based on the plurality of landmarks of the point cloud.

11. The method of claim 10, wherein the method further comprises:
- generating a value based on the position of the 3D model relative to the point cloud; and
- causing display of the value at the client device.

12. The method of claim 8, wherein the image data comprises a set of attributes, and the method further comprises:
- selecting the bit mask from among the plurality of bit masks based on at least the set of attributes of the image data.

13. The method of claim 8, wherein the applying the bit mask to the first data stream includes:
- receiving an input that selects the bit mask from among a plurality of bit masks.

14. The method of claim 8, wherein the causing display of the visualization of the point cloud includes:
- presenting the visualization of the point cloud upon a presentation of the first data stream at the client device.

15. A non-transitory machine-readable storage medium, storing instructions which, when executed by at least one processor of a machine, cause the machine to perform operations comprising:
- accessing a first data stream at a client device, the first data stream comprising image data that comprises a set of image bits that comprise attributes, the image data depicting an object;
- accessing a bit mask that corresponds with the object depicted by the image data from among a plurality of bit masks, the bit mask identifying a portion of the set of image bits of the image data based on the attributes of the portion of the set of image bits;
- accessing a second data stream at the client device, the second data stream comprising depth data associated with the portion of the image data identified by the bit mask;
- generating a point cloud based on the depth data, the point cloud comprising a set of data points that define surface features of an object depicted in the first data stream, and
- causing display of a visualization of the point cloud at the client device.

16. The non-transitory machine-readable storage medium of claim 15, wherein the instructions cause the machine to perform operations further comprising:
- receiving an input that selects a subset of the set of data points of the point cloud;
- applying a label to the subset of the set of data points;
- generating a training dataset based on the label and the subset of the set of data points; and
- fitting a machine learned model to the training dataset.

17. The non-transitory machine-readable storage medium of claim 15, wherein the instructions cause the machine to perform operations further comprising:
- accessing the point cloud;
- identifying a plurality of landmarks based on the point cloud;
- determining a classification associated with the point cloud based on the plurality of landmarks;
- retrieving a 3D model based on the classification and the plurality of landmarks; and
- applying the 3D model to a position in a 3D space relative to the point cloud, based on the plurality of landmarks of the point cloud.

18. The non-transitory machine-readable storage medium of claim 17, wherein the instructions cause the machine to perform operations further comprising:
- generating a value based on the position of the 3D model relative to the point cloud; and
- causing display of the value at the client device.

19. The non-transitory machine-readable storage medium of claim 15, wherein the image data comprises a set of attributes, and the instructions cause the machine to perform operations further comprising:

selecting the bit mask from among the plurality of bit masks based on at least the set of attributes of the image data.

20. The non-transitory machine-readable storage medium of claim 15, wherein the applying the bit mask to the first data stream includes:

receiving an input that selects the bit mask from among a plurality of bit masks.

* * * * *